United States Patent
Lee

(10) Patent No.: US 10,074,338 B2
(45) Date of Patent: Sep. 11, 2018

(54) DISPLAY DEVICE WITH INTEGRATED TOUCH SCREEN AND DRIVING METHOD THEREOF

(71) Applicant: LG Display Co., Ltd., Seoul (KR)

(72) Inventor: Young Joon Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 195 days.

(21) Appl. No.: 14/495,552

(22) Filed: Sep. 24, 2014

(65) Prior Publication Data

US 2015/0179132 A1 Jun. 25, 2015

(30) Foreign Application Priority Data

Dec. 19, 2013 (KR) ........................ 10-2013-0158957

(51) Int. Cl.
*G09G 5/00* (2006.01)
*G06F 3/041* (2006.01)
*G06F 3/044* (2006.01)

(52) U.S. Cl.
CPC ............. *G09G 5/006* (2013.01); *G06F 3/044* (2013.01); *G06F 3/0412* (2013.01); *G06F 3/0416* (2013.01)

(58) Field of Classification Search
CPC ......... G09G 5/006; G06F 3/012; G06F 3/046; G06F 3/0416
See application file for complete search history.

(56) References Cited

U.S. PATENT DOCUMENTS 7,859,521 B2 12/2010 Hotelling et al.
2009/0009494 A1 1/2009 Lee
(Continued)

FOREIGN PATENT DOCUMENTS

CN 101339752 A 1/2009
CN 103164076 A 6/2013
(Continued)

OTHER PUBLICATIONS

Friedman, M., et al., "The Best Teachers' Test Preparation for the Florida Teacher Certification Examination (FTCE) Mathematics 6-12," Definition for Magnitude, 2008, p. 50, Cover Page, Copyright Page, Research & Education Associate, Inc., can be retrieved from the internet at www.books.google.com, <URL:https://books.google.com/books?id=EQ3UzahT_kkC&pg=PP1&dq=The+Best+Teachers%E2%80%99+Test+Preparation+for+the+Florida+Teacher+Certification+Examination+(FTCE)+Mathematics&hl=en&sa=X&ved=0ahUKEwiCnIDgs4_OAhUMxWMKHbSXCwg-Q6AEIQzAD#v=onepage&q=The%20Best%20Teachers%E2%80%99%20Test%20Preparation%20for%20the%20Florida%20Teacher%20Certification%20Examination%20(FTCE)%20Mathematics&f=false>.
(Continued)

Primary Examiner — Kevin M Nguyen
(74) Attorney, Agent, or Firm — Fenwick & West LLP

(57) ABSTRACT

Disclosed is a display device with an integrated touch screen. The display device includes a panel including a plurality of driving electrodes and a plurality of sensing electrodes and a display driver IC configured to apply a common voltage to the plurality of driving electrodes and the plurality of sensing electrodes during a display driving mode. The display driver IC is configured to apply a driving pulse to the plurality of driving electrodes during the touch driving mode of the panel and receive one or more sensing signals from the plurality of sensing electrodes responsive to a touch of the integrated touch screen during the touch driving mode. The display driver IC is configured to adjust a magnitude of the driving pulse from a first level to a second level and subsequently from the second level to a third level during the touch driving mode of the panel.

15 Claims, 6 Drawing Sheets

(56) References Cited

U.S. PATENT DOCUMENTS

| | | | | |
|---|---|---|---|---|
| 2010/0253638 A1* | 10/2010 | Yousefpor | ............ | G06F 3/0416 345/173 |
| 2011/0210927 A1 | 9/2011 | Mizuhashi et al. | | |
| 2013/0147724 A1 | 6/2013 | Hwang et al. | | |
| 2013/0162595 A1 | 6/2013 | Lee | | |
| 2013/0241868 A1 | 9/2013 | Kim et al. | | |
| 2013/0307820 A1 | 11/2013 | Kim | | |
| 2013/0314343 A1 | 11/2013 | Cho et al. | | |
| 2013/0335376 A1 | 12/2013 | Lee | | |
| 2014/0049509 A1* | 2/2014 | Shepelev | ............. | G06F 3/0416 345/174 |
| 2014/0184534 A1 | 7/2014 | Lee et al. | | |

FOREIGN PATENT DOCUMENTS

| | | | |
|---|---|---|---|
| CN | 103309495 | A | 9/2013 |
| CN | 103424909 | A | 12/2013 |
| CN | 103424914 | A | 12/2013 |
| KR | 10-1295537 | B1 | 8/2013 |
| TW | 201211851 | A | 3/2012 |
| TW | 201243689 | A | 11/2012 |

OTHER PUBLICATIONS

Downing, D., "Dictionary of Mathematics Terms," Third Edition, Definition for Scalar, 2009, p. 300, Cover Page, Copyright Page, Barron's Educational Series, Inc., can be retrieved from the internet at www.books.google.com, <URL:https://books.google.com/books?id=ZkURXkqwbRUC&q=Dictionary+of+Mathematics+Terms&dq=Dictionary+of+Mathematics+Terms&hl=en&sa=X&ved=0ahUKEwjStqyGtY_OAhUM5WMKHVxOAYIQ6AEIHjAA>.

Office Action for Chinese Patent Application No. CN 201410594139.3, dated Mar. 27, 2017, 5 Pages (With Concise Explanation of Relevance).

Communication Pursuant to Article 94(3) EPC for European Patent Application No. EP 14187271.3, dated Jul. 21, 2017, 6 Pages.

* cited by examiner

DISPLAY DEVICE WITH INTEGRATED TOUCH SCREEN AND DRIVING METHOD THEREOF

CROSS-REFERENCE TO RELATED APPLICATIONS

This application claims the benefit of the Korean Patent Application No. 10-2013-0158957 filed on Dec. 19, 2013, which is hereby incorporated by reference as if fully set forth herein.

BACKGROUND

Field of Technology

The embodiments herein relate to a display device, and more particularly, to a display device with an integrated in-cell type touch screen and a driving method thereof.

Discussion of the Related Art

Touch screens are a type of input device that are included in display devices such as liquid crystal display (LCD) devices, field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

Particularly, the demand for display devices with an integrated in-cell type touch screen, which include a plurality of built-in elements configuring the touch screen for slimming portable terminals such as smart phones and tablet personal computers (PCs), is increasing.

In a related art display device with integrated in-cell type touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures a mutual capacitance change that occurs in touch, and thus determines whether there is a touch.

In the display device with an integrated in-cell type touch screen, a driving pulse is applied to common electrodes corresponding to a touch driving area when a panel operates in a touch driving mode in order for each of the common electrodes to perform a function of a touch electrode.

In this case, as a distance between a touch electrode and a circuit unit which applies the driving pulse to the touch electrode increases, the driving pulse is delayed, and for this reason, a time constant of the driving pulse increases, and a charging rate based on the driving pulse is reduced. As a result, as the distance between the touch electrode and the circuit unit increases, a level of a touch signal which is detected in a sensing area is reduced, and for this reason, a reduction and deviation of touch performance occur in each touch driving area.

SUMMARY

Accordingly, the embodiments herein are directed to provide a display device with an integrated in-cell type touch screen and a driving method thereof that substantially obviate one or more problems due to limitations and disadvantages of the related art.

An aspect of the embodiments herein are directed to provide a display device with an integrated in-cell type touch screen, which can enhance touch performance by applying overdriving and under-driving to a driving pulse for touch driving.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages, as embodied and broadly described herein, there is provided a display device with an integrated touch screen including: a panel configured to operate in a display driving mode and a touch driving mode, the panel including a plurality of driving electrodes and a plurality of sensing electrodes; and a display driver integrated circuit (IC) configured to apply a common voltage to the plurality of driving electrodes and the plurality of sensing electrodes during the display driving mode of the panel, and the display driver IC is configured to apply a driving pulse to the plurality of driving electrodes during the touch driving mode of the panel and receive one or more sensing signals from the plurality of sensing electrodes responsive to a touch of the integrated touch screen during the touch driving mode of the panel, wherein the display driver IC is configured to adjust a magnitude of the driving pulse from a first level to a second level and subsequently from the second level to a third level during the touch driving mode of the panel, wherein the third level is less than the second level and greater than the first level.

In one embodiment, there is provided a method of driving a display device with an integrated touch screen that includes a panel configured to operate in a display driving mode and a touch driving mode, the panel including a plurality of driving electrodes and a plurality of sensing electrodes, the method comprising: applying a common voltage to the plurality of driving electrodes and the plurality of sensing electrodes during the display driving mode of the panel; adjusting a magnitude of a driving pulse applied to the plurality of driving electrodes during the touch driving mode of the panel, the magnitude of the driving pulse adjusted from a first level to a second level and subsequently from the second level to a third level during the touch driving mode of the panel, wherein the third level is less than the second level and greater than the first level; and receiving one or more sensing signals from the plurality of sensing electrodes responsive to a touch of the integrated touch screen during the touch driving mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In this disclosure below, for convenience of a description, a display device with an integrated touch screen according to embodiments of the present invention will be exemplarily described as being an LCD device, but the present invention is not limited thereto. The present invention may be applied to various display devices such as FEDs, PDPs, ELDs, and EPDs. Also, a description on the general configuration of an LCD device is not provided.

Figure 1:
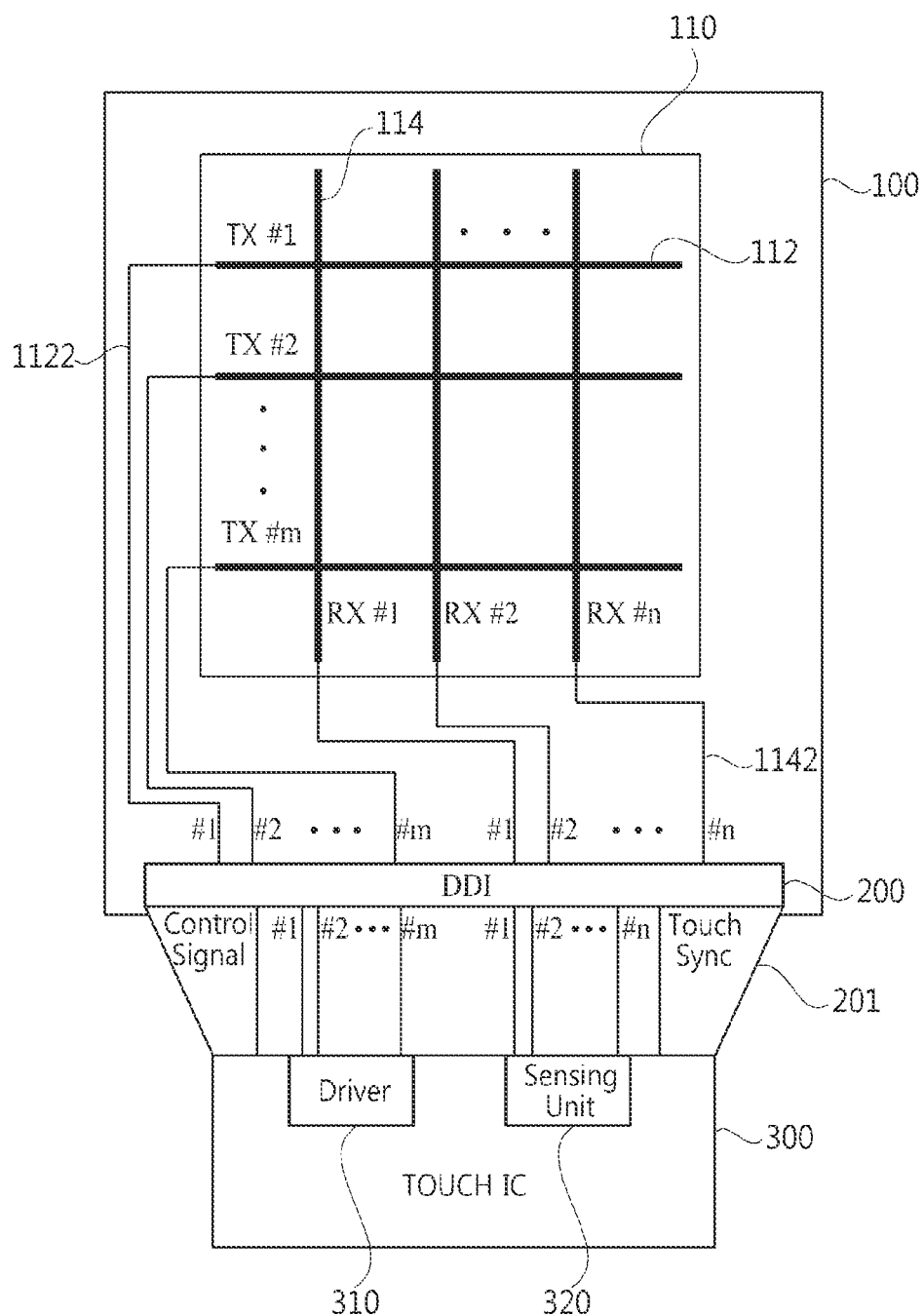
FIG. 1 is a diagram schematically illustrating a configuration of a display device with an integrated touch screen according one embodiment.
Figure 2:
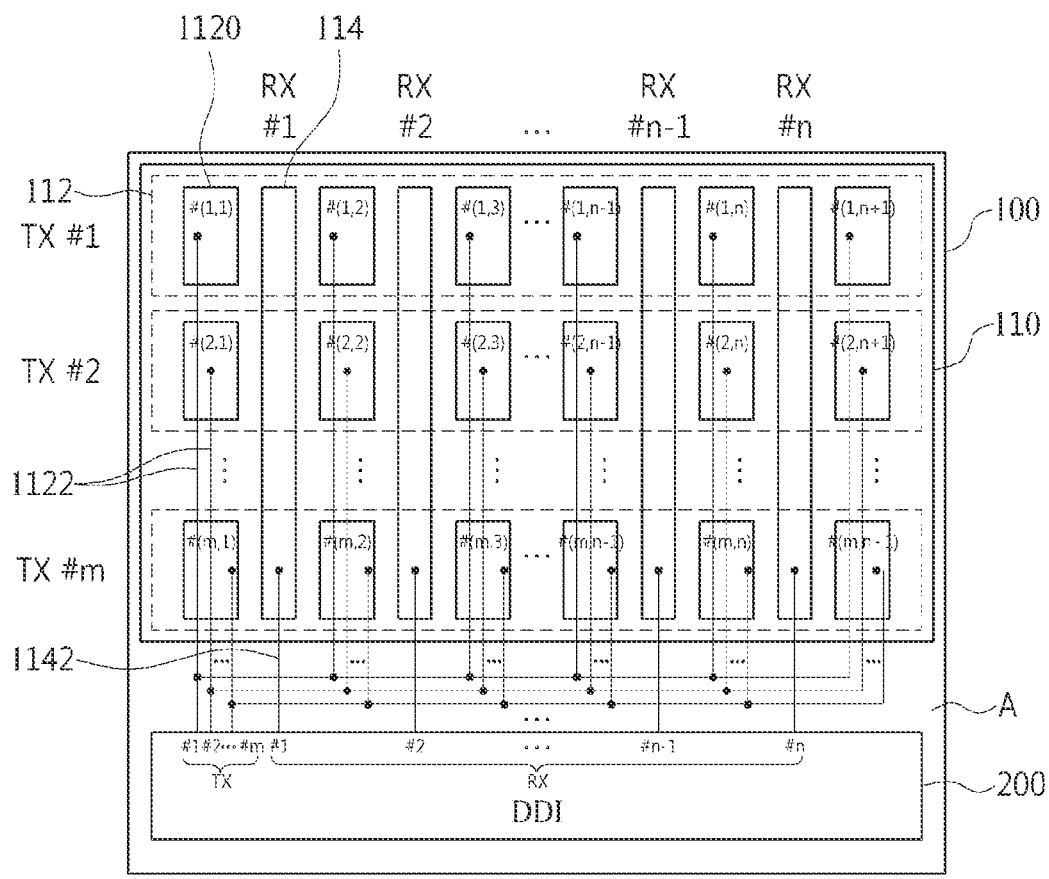
FIG. 2 is a diagram illustrating a detailed structure of a plurality of driving electrodes and a plurality of sensing electrodes illustrated in FIG. 1 according to one embodiment.

FIG. 1 is a diagram schematically illustrating a configuration of a display device with an integrated touch screen according to one embodiment, and FIG. 2 is a diagram illustrating a detailed structure of a plurality of driving electrodes and a plurality of sensing electrodes illustrated in FIG. 1 according to one embodiment.

As illustrated in FIG. 1, the display device with an integrated touch screen includes a panel 100, a display driver IC (DDI) 200, and a touch IC 300.

The touch screen 110 is built in the panel 100, and the touch screen 110 includes a plurality of driving electrodes 112 and a plurality of sensing electrodes 114.

The respective driving electrodes 112 may be connected to the display driver IC 200 through a plurality of driving electrode lines 1122, and the respective sensing electrodes 114 may be connected to the display driver IC 200 through a plurality of sensing electrode lines 1142.

For example, when the display device with the integrated touch screen is driven in a display driving mode, the driving electrodes 112 and the sensing electrodes 114 may perform the function of a common electrode. However, when the display device with the integrated touch screen is driven in a touch driving mode, the driving electrodes 112 may perform the function of a touch driving electrode, and the sensing electrodes 114 may perform the function of a touch sensing electrode.

In other words, the driving electrodes and sensing electrodes of the display device with integrated touch screen according to embodiments herein may act as common electrodes, and moreover may perform a function of a touch electrode as well as a function of a display electrode.

In an embodiment, the driving electrodes 112 may be formed to be parallel with a width direction (i.e., a first direction) of the panel 100 that is the direction of a gate line (not shown) in the panel 100. That is, the driving electrodes 112 are formed in a direction that is parallel to the direction of a gate line in the panel 100. Each of the sensing electrodes 114 may be disposed between adjacent sub driving electrodes among a plurality of sub driving electrodes (not shown), and formed to be parallel with a height direction (i.e., a second direction) of the panel 100 that is the direction of a data line (not shown) in the panel 100. That is, the sensing electrodes 114 are formed in a direction that is parallel to the direction of a data line in the panel 100.

For example, as illustrated in FIG. 2, the driving electrodes 112 may include first to mth driving electrodes TX#1 to TX#m, and each of the driving electrodes 112 may include n+1 number of sub driving electrodes 1120. Also, the sensing electrodes 114 may include first to nth sensing electrodes RX#1 to RX#n. In order to configure one driving electrode, the sub driving electrodes 1120 may be electrically connected to each other by a plurality of driving electrode lines 1122 in a non-display area A of the panel 100 which is formed outside the display driver IC 200, respectively. Alternatively, although not shown, the sub driving electrodes 1120 may be electrically connected to each other in the display driver IC 200, or may be electrically connected to each other through respective connection lines in a display area of the panel 100.

Each of the driving electrodes 112 may be formed as a plurality of block-form common electrodes that are formed to be overlapped with a plurality of unit pixel areas, and each of the sensing electrodes 114 may be formed as one block-form common electrode that is formed to be overlapped with the unit pixel areas.

The driving electrodes 112 and the sensing electrodes 114 need to act as a common electrode for driving liquid crystal, and thus may be formed of a transparent material such as indium tin oxide (ITO).

During a first period in which the panel 100 operates in the display driving mode, the display driver IC 200 generates a common voltage (Vcom), and applies the common voltage to the plurality of driving electrodes 112 and the plurality of sensing electrodes 114. Vcom is an example of a reference voltage.

For example, when the panel 100 operates in the display driving mode, the plurality of driving electrodes 112 and the plurality of sensing electrodes 114 should perform a function of a display electrode, and thus, the display driver IC 200 may apply the common voltage to the plurality of driving electrodes 112 and the plurality of sensing electrodes 114.

Moreover, during a second period in which the panel 100 operates in a touch driving mode, the display driver IC 200 generates a driving pulse, which includes a maximum voltage with an overdriving voltage applied thereto and a minimum voltage with an under-driving voltage applied thereto, according to a timing pulse to apply the driving pulse to the plurality of driving electrodes 112, and respectively receives sensing signals from the plurality of sensing electrodes 114 to transfer the sensing signals to the touch IC 300.

For example, the display driver IC 200 may generate the driving pulse by using the timing pulse generated by the touch IC 300, and apply the driving pulse to the plurality of driving electrodes 112. Here, the timing pulse includes only timing information of the driving pulse, and the display driver IC 200 may generate the driving pulse, which includes the maximum voltage with the overdriving voltage applied thereto and the minimum voltage with the under-driving voltage applied thereto, by using the timing pulse including the timing information of the driving pulse.

The display driver IC 200 may output the maximum voltage with the overdriving voltage applied thereto for an overdriving time, and output the minimum voltage with the under-driving voltage applied thereto for an under-driving time.

Moreover, the driving pulse may be divided into, as a high-level voltage, a high-level driving voltage and a maximum voltage to which the overdriving voltage is applied. Also, the driving pulse may be divided into, as a low-level voltage, a low-level driving voltage and a minimum voltage to which the under-driving voltage is applied.

The maximum voltage to which the overdriving voltage is applied is a voltage which is higher by the overdriving voltage than the high-level driving voltage, and the minimum voltage to which the under-driving voltage is applied is a voltage which is lower by the under-driving voltage than the low-level driving voltage.

In other words, the display driver IC 200 may generate the maximum voltage by using the high-level driving voltage and the overdriving voltage, and generate the minimum voltage by using the low-level driving voltage and the under-driving voltage.

Therefore, the display device with an integrated touch screen according to embodiments herein applies the driving pulse, to which the overdriving voltage and the under-driving voltage are applied, to a driving electrode, and thus, a time constant of the driving pulse is reduced, thereby enhancing a charging rate based on the driving pulse.

Moreover, the display driver IC 200 generates a gate control signal and a data control signal with a timing signal transmitted from an external system, and realigns input video data signals so as to match the pixel structure of the panel 100, for outputting an image through the panel 100.

To this end, the display driver IC 200 may further include a gate driver that applies a scan signal to a gate line, a data driver that applies an image data signal to a data line, and a controller that controls the elements.

The touch IC 300 generates a driving pulse to apply the driving pulse to the display driver IC 200, and receives a sensing signal from the display driver IC 200 to determine whether there is a touch.

To this end, the touch IC 300 includes a driver 310 and a sensing unit 320. Here, the touch IC 300 may be connected to the display driver IC 200 through a flexible printed circuit board (FPCB) 201.

The driver 310 generates the timing pulse to apply the timing pulse to the display driver IC 200, and the sensing unit 320 receives a sensing signal from the display driver IC 200 to determine whether there is a touch. Also, a touch sensing reference voltage VRX_REF is applied to the sensing unit 320, and the touch sensing reference voltage VRX_REF is substantially applied to a sensing electrode 114 by an operational amplifier included in the sensing unit 320.

Therefore, the touch IC 300 determines whether there is a touch, by using a shift of a voltage caused by a capacitance change between a driving electrode 112 and a sensing electrode 114 with respect to the touch sensing reference voltage VRX_REF.

Hereinafter, the display driver IC 200 and the touch IC 300 will be described in detail with reference to FIG. 3.

Figure 3:
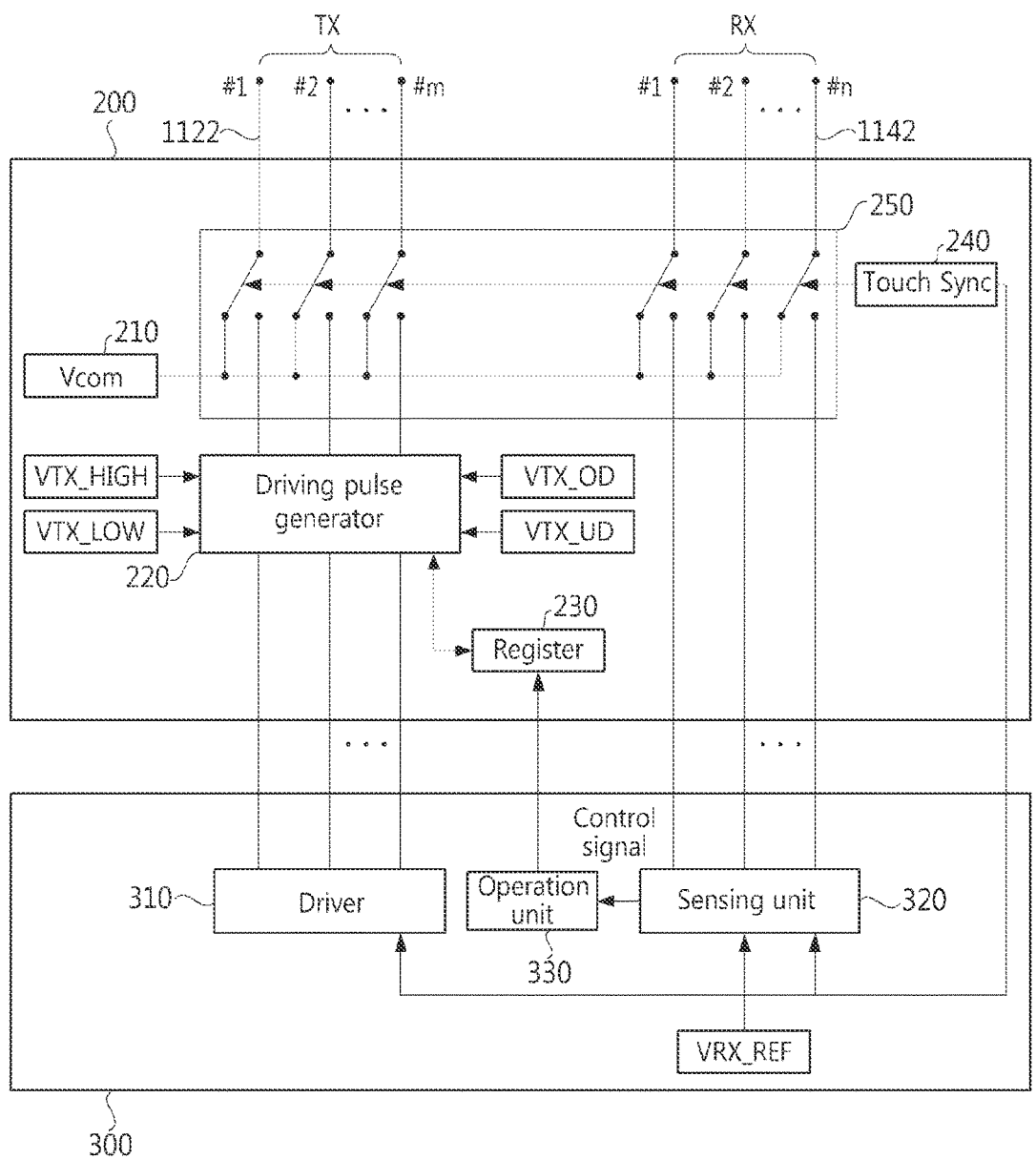
FIG. 3 is a diagram schematically illustrating configurations of a display driver integrated circuit (IC) and a touch IC according to one embodiment.

FIG. 3 is a diagram schematically illustrating configurations of the display driver IC 200 and the touch IC 300 according to one embodiment.

The display driver IC 200, as illustrated in FIG. 3, may include a common voltage generator 210, a driving pulse generator 220, a register 230, a sync signal generator 240, and a switching unit 250.

The common voltage generator 210 generates the common voltage Vcom for driving liquid crystal, and outputs the common voltage to the switching unit 250.

The driving pulse generator 220 generates the driving pulse by using the timing pulse generated by the driver 310 of the touch IC 300. Here, the driving pulse generator 220 may be a level shifter that shifts a voltage.

Moreover, the driving pulse generator 220 may generate, as a high-level voltage, a high-level driving voltage VTH_HIGH and a maximum voltage to which an overdriving voltage VTX_OD is applied, and may generate, as a low-level voltage, a low-level driving voltage VTX_LOW and a minimum voltage to which an under-driving voltage VTX_UD is applied.

In detail, the driving pulse generator 220 may generate the maximum voltage and the minimum voltage on the basis of a value of the overdriving voltage and a value of the under-driving voltage, which are stored in the register 230, for each driving electrode.

The driving pulse generator 220 may generate and output the maximum voltage with the overdriving voltage applied thereto for an overdriving time, and for an under-driving time, the driving pulse generator 220 may generate and output the minimum voltage with the under-driving voltage applied thereto.

In detail, the driving pulse generator 220 may generate and output the maximum voltage and the minimum voltage on the basis of the overdriving time and the under-driving time, stored in the register 230, for each driving electrode.

Moreover, the driving pulse generator 220 may generate the driving pulse, based on the timing information of the timing pulse generated by the touch IC 300.

In detail, the driving pulse generator 220 may generate the maximum voltage by using the high-level driving voltage VTH_HIGH and the over-driving voltage VTX_OD when the timing pulse rises from a low voltage to a high voltage, and when the timing pulse falls from the high voltage to the low voltage, the driving pulse generator 220 may generate the low-level driving voltage VTX_LOW and the under-driving voltage VTX_UD.

As a result, the maximum voltage may be a voltage which is higher by the high-level driving voltage VTH_HIGH than the overdriving voltage VTX_OD, and the minimum voltage may be a voltage which is lower by the under-driving voltage VTX_UD than the low-level driving voltage VTX_LOW.

Hereinafter, the driving pulse will be described in detail with reference to FIGS. 4 and 5.

Figure 4:
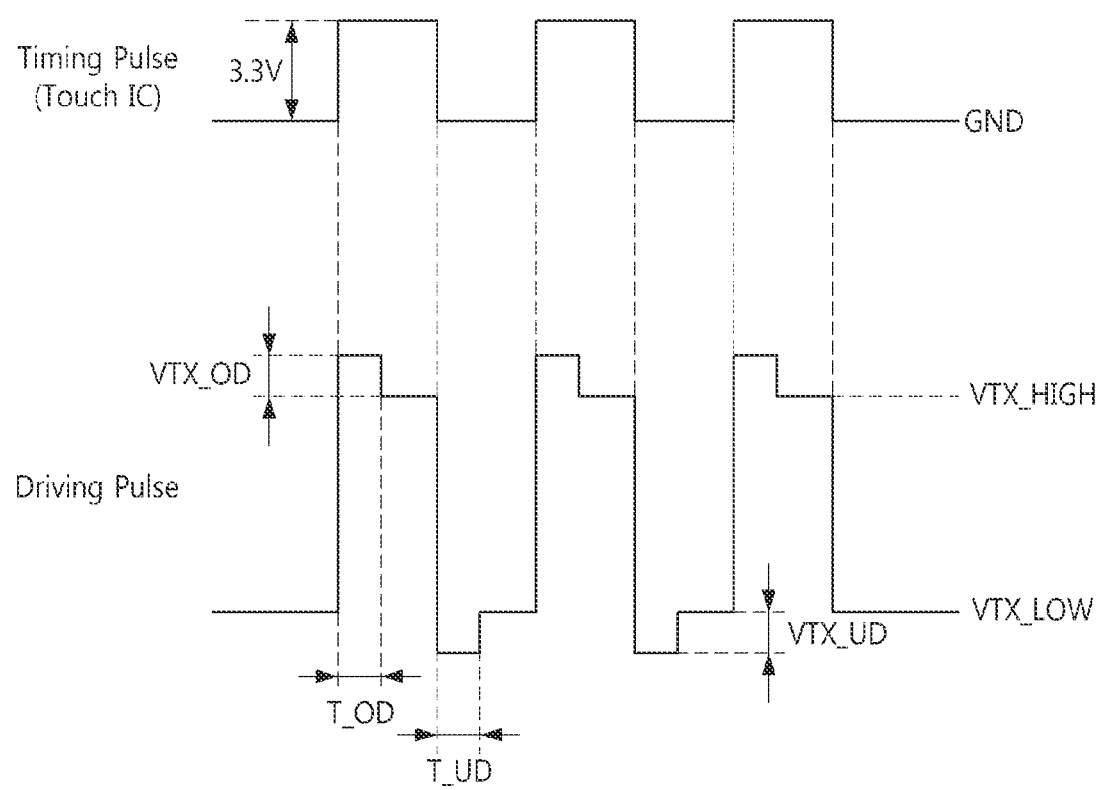
FIG. 4 is a diagram showing an example of each of a timing pulse and a driving pulse applied to the display device with integrated touch screen according to one embodiment.
Figure 5:
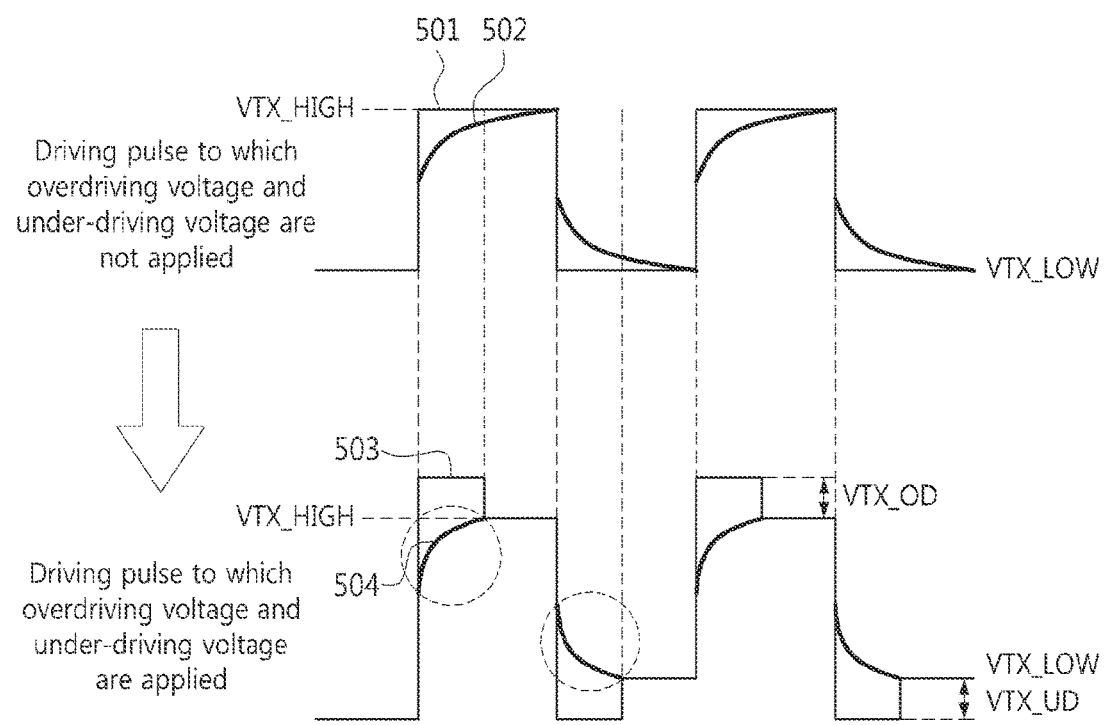
FIG. 5 is a diagram for describing that an overdriving voltage and an under-driving voltage are applied to a driving pulse used in the display device with an integrated touch screen according to one embodiment.

FIG. 4 is a diagram showing an example of each of the timing pulse and the driving pulse applied to the display device with integrated touch screen according to one embodiment, and FIG. 5 is a diagram for describing that the overdriving voltage and the under-driving voltage are applied to the driving pulse used in the display device with integrated touch screen according to one embodiment.

As shown in FIG. 4, it can be seen that the driving pulse is generated by the touch IC 300 according to the timing pulse.

For example, the timing pulse is a voltage between a ground GND voltage (e.g., a first voltage level) and 3.3 V (e.g., a second voltage level), and may include the timing information of the driving pulse. Also, in the driving pulse, it can be seen that the maximum voltage of the driving pulse is equivalent to the sum of the overdriving voltage VTX_OD and the high-level driving voltage VTX_HIGH and is generated when the timing pulse rises from a low voltage GND to a high voltage (3.3 V), and is output for an overdriving time T_OD. Furthermore, the minimum voltage of the driving pulse is the difference between the low-level driving voltage VTX_LOW and the under-driving voltage VTX_UD and is generated when the timing pulse falls from the high voltage (3.3 V) to the low voltage GND, and is output for an under-driving time T_UD.

Moreover, when the overdriving voltage and the under-driving voltage are not applied, a driving pulse 501 which is illustrated as a thin solid line in an upper portion of FIG. 5 is a driving pulse which is generated by the driving pulse generator 220 and is output by the display driver IC 200, and a driving pulse 502 illustrated as a thick solid line is a driving pulse which is delayed and is actually applied to a driving electrode. As illustrated in an upper portion of FIG. 5, in the driving pulse 501 output by the display driver IC 200, it can be seen that as the driving electrode becomes farther away from the display driver IC 200, a charging rate up to the high-level driving voltage VTX_HIGH is reduced due to delay.

On the other hand, when the overdriving voltage and the under-driving voltage are applied, a driving pulse 503 which is illustrated as a thin solid line in a lower portion of FIG. 5 is the driving pulse which is generated by the driving pulse generator 220 and is output by the display driver IC 200, and a driving pulse 504 illustrated as a thick solid line is the driving pulse which is delayed and is actually applied to a driving electrode. As illustrated in a lower portion of FIG. 5, in the driving pulse 503 output by the display driver IC 200, it can be seen that by applying the overdriving voltage and the under-driving voltage, the charging rate up to the high-level driving voltage VTX_HIGH is improved by reducing delay which is caused by that the driving electrode becomes farther away from the display driver IC 200.

Referring again to FIG. 3, the register 230 may store the value of the overdriving voltage and the value of the under-driving voltage for each of the plurality of driving electrodes.

For example, the value of the overdriving voltage and the value of the under-driving voltage for each driving electrode may be previously set and stored in the register 230, or may be changed according to a control signal of an operation unit 330 of the touch IC 300 to be described below.

Furthermore, an overdriving time that is an output time of a maximum voltage and an under-driving time that is an output time of a minimum voltage may be previously set for each driving electrode and stored in the register 230, or may be changed for each driving electrode according to the control signal of the operation unit 330 of the touch IC 300 to be described below.

Moreover, the value of the overdriving voltage and the value of the under-driving voltage for each driving electrode may be set with respect to a maximum overdriving voltage and a maximum under-driving voltage, and stored in the register 230.

For example, when the maximum overdriving voltage is 1V, an overdriving voltage may be subdivided into a total of 32 levels of voltages with respect to the maximum overdriving voltage, and the values of the subdivided overdriving voltages for each driving electrode may be stored in a 5-bit register.

A value of an overdriving voltage and a value of an under-driving voltage, which are applied to the driving pulse, may be the same or different in units of at least two electrodes among the plurality of driving electrodes.

For example, a value of an overdriving voltage and a value of an under-driving voltage may be different in units of an electrode, or may be partially the same in units of at least two adjacent driving electrodes.

Therefore, the display device with integrated touch screen according to embodiments herein applies the driving pulse to which the overdriving voltage and the under-driving voltage are applied for each driving electrode, and thus can prevent, by position of each driving electrode, a charging rate from being reduced when the position of a driving electrode is farther away from the display driver IC 200. Accordingly, a touch sensitivity increases for each driving electrode, and thus, a touch performance deviation is improved, thereby enhancing touch performance.

The sync signal generator 240 generates a sync signal (Touch Sync) that indicates a driving mode of the panel 100. Here, the sync signal may include a first sync signal, which indicates the display driving mode, and a second sync signal which indicates the touch driving mode.

For example, in an image output section where the panel 100 operates in the display driving mode, the sync signal generator 240 generates the first sync signal which indicates the display driving mode, and outputs the first sync signal to the switching unit 250 and the touch IC 300. In a touch sensing section where the panel 100 operates in the touch driving mode, the sync signal generator 240 generates the second sync signal which indicates the touch driving mode, and outputs the second sync signal to the switching unit 250 and the touch IC 300.

When the first sync signal is input, the switching unit 250 connects the common voltage generator 210 to the plurality of driving electrodes 112 and the plurality of sensing electrodes 114, and thus, the common voltage Vcom is applied to the plurality of driving electrodes 112 and the plurality of sensing electrodes 114. Also, when the second sync signal is input, the switching unit 250 connects the driving pulse generator 220 to the plurality of driving electrodes 112 and connects the sensing unit 320 of the touch IC 300 to the plurality of sensing electrodes 114, and thus, the driving pulse is applied to the plurality of driving electrodes, and a plurality of sensing signals are respectively received from the plurality of sensing electrodes.

In the touch IC 300, as illustrated in FIG. 3, the driver 310 generates the timing pulse to output the timing pulse to the driving pulse generator 220, the touch sensing reference voltage VRX_REF is applied to the sensing unit 320, and the operation unit 330 performs an arithmetic operation on the value of the overdriving voltage and the value of the under-driving voltage for each driving electrode according to the sensing signal to output a corresponding control signal to the register 230.

Here, the corresponding control signal may include a control signal based on an arithmetic operation which is performed on the overdriving time, which is an output time of the maximum voltage, and the under-driving time that is an output time of the minimum voltage, according to the sensing signal.

The sync signal, generated by the synch signal generator 240 of the display driver IC 200, is applied to the driver 310 and the sensing unit 320. The driver 310 and the sensing unit 320 operate according to the sync signal generated by the synch signal generator 240 of the display driver IC 200.

For example, when the second synch signal indicating the touch driving mode is input, the driver 310 may generate a first driving pulse to output the first driving pulse to the driving pulse generator 230 of the display driver IC 200, and the sensing unit 320 may receive a sensing signal from the display driver IC 200 to determine whether there is a touch.

The sensing unit 320 may include an operational amplifier (not shown) and an analog-to-digital converter (ACD, not shown), which correspond to each of the plurality of sensing electrodes 114.

For example, the operational amplifier (not shown) may include a non-inverting input terminal receiving the touch sensing reference voltage VRX_REF, an inverting input terminal connected to one of the plurality of sensing electrodes 114, and an output terminal connected to the ADC (not shown).

In detail, when the touch sensing reference voltage VRX_REF is applied to the non-inverting input terminal of the operational amplifier (not shown), the inverting input terminal and the non-inverting input terminal need to form a virtual ground in operating characteristic of the operational amplifier, and thus, the touch sensing reference voltage VRX_REF is substantially applied to the sensing electrodes 114.

Furthermore, although the driving electrode 112 is not electrically connected to the sensing electrode 114, a mutual capacitance ($C_M$) between the driving electrode 112 and the sensing electrode 114 is changed by the driving pulse applied to the driving electrode 112. The operational amplifier (not shown) may integrate the mutual capacitance change to output the integrated result as a voltage to the ADC (not shown), or transfer the mutual capacitance change as a voltage to the ADC (not shown).

The ADC (not shown) converts a voltage, output from the operational amplifier, into a digital code. Also, the sensing unit 320 may include a touch analyzer (not shown) that analyzes the mutual capacitance change output from the ADC (not shown) to determine whether there is a touch.

Hereinafter, a method of driving the display device with integrated touch screen according to embodiments of the present invention will be described with reference to FIG. 6.

Figure 6:
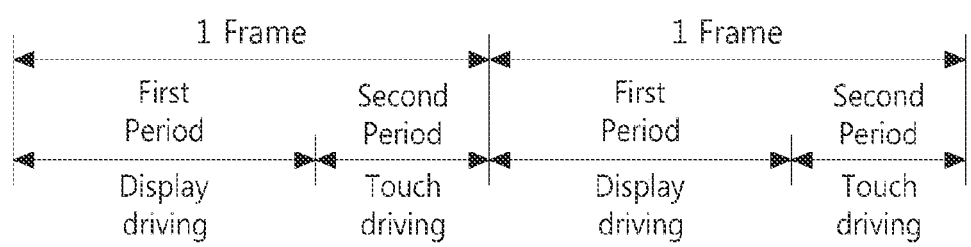
FIG. 6 is a schematic timing chart for describing a method of driving the display device with integrated touch screen according to one embodiment.

FIG. 6 is a schematic timing chart for describing a method of driving the display device with integrated touch screen according to one embodiment.

In the timing chart of FIG. 6, it is illustrated that each frame includes first and second periods, but the embodiments herein are not limited thereto. According to another embodiment, the first and second periods may be alternatively included in each frame. In this case, also, a display driving frequency may be adjusted to 60 Hz, 120 Hz, 240 Hz, or more depending on the number and time of the first period that is the display driving mode, and a touch report rate may be adjusted to 60 Hz, 100 Hz, or more depending on the number and time of the second period that is the touch driving mode.

As illustrated in FIG. 6, the display driver IC 200 applies the common voltage to a plurality of electrodes during the first period.

For example, when the panel 100 is a mutual capacitance type during the first period in which the panel 100 operates in the display driving mode, the display driver IC 200 may apply the common voltage to the plurality of driving electrodes and the plurality of sensing electrodes.

Subsequently, during the second period, the display driver IC 200 generates the driving pulse, which includes the maximum voltage with the overdriving voltage applied thereto and the minimum voltage with the under-driving voltage applied thereto, according to the timing pulse to apply the driving pulse to the plurality of driving electrodes, and the touch IC 300 determines whether there is a touch, by using the sensing signals respectively generated from the plurality of sensing electrodes.

For example, during the second period in which the panel 100 operates in the touch driving mode, the display driver IC 200 may apply the driving pulse, to which the overdriving voltage and the under-driving voltage are applied, to the plurality of driving electrodes 112, and may respectively receive the sensing signals from the plurality of sensing electrodes 114 to transfer the sensing signals to the touch IC 300. The touch IC 300 may determine whether there is a touch, by using the sensing signals.

Therefore, the method of driving the display device with integrated touch screen according to embodiments herein applies the driving pulse to which the overdriving voltage and the under-driving voltage are applied for each driving electrode, and thus increases a touch sensitivity, thereby enhancing touch performance.

According to the embodiments of the present invention, the driving pulse to which the overdriving voltage and the under-driving voltage are applied is applied to the driving electrodes, and thus, a charging rate based on the driving pulse is enhanced, and a touch performance deviation of the driving electrodes is improved, thereby enhancing touch performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with an integrated touch screen, the display device comprising:
    a panel configured to operate in a display driving mode and a touch driving mode, the panel including a plurality of driving electrodes and a plurality of sensing electrodes; and
    a display driver integrated circuit (IC) configured to apply a common voltage to the plurality of driving electrodes and the plurality of sensing electrodes during the display driving mode of the panel, and the display driver IC is configured to apply a driving pulse to the plurality of driving electrodes during the touch driving mode of the panel and receive one or more sensing signals from the plurality of sensing electrodes responsive to a touch of the integrated touch screen during the touch driving mode of the panel,
    wherein the display driver IC is configured to adjust a magnitude of the driving pulse from a first level to a second level and subsequently from the second level to a third level and subsequently from the third level to a fourth level and subsequently from the fourth level to the first level during the touch driving mode of the panel, wherein the third level is less than the second level and greater than the first level,
    wherein the fourth level is less than the first level,
    wherein a difference in magnitude between the second level and the third level of the driving pulse is different than a difference in magnitude between the fourth level and the first level of the driving pulse.

2. The display device of claim 1, wherein the display driver IC comprises:

a common voltage generator configured to generate the common voltage; and a driving pulse generator configured to generate the driving pulse according to a voltage level of a timing pulse that alternates between a first voltage level and a second voltage level that is greater than the first voltage level.

3. The display device of claim 2, wherein the display driver IC is configured to adjust the magnitude of the driving pulse from the first level to the second level and subsequently from the second level to the third level when the timing pulse is at the second voltage level, and wherein the display driver IC is configured to adjust the driving pulse from the third level to the fourth level and subsequently from the fourth level to the first level when the timing pulse is at the first voltage level.

4. The display device of claim 3, wherein the display driver IC outputs the second level of the driving pulse for a first period of time when the timing pulse is at the second voltage level and the display driver IC outputs the third level of the driving pulse for a second period of time following the first period of time when the timing pulse is at the second voltage level.

5. The display device of claim 3, wherein the display driver IC outputs the fourth level of the driving pulse for a first period of time when the timing pulse is at the first voltage level and the display driver IC outputs the first level of the driving pulse for a second period of time following the first period of time when the timing pulse is at the first voltage level.

6. The display device of claim 2, further comprising:

a touch IC configured to generate the timing pulse outputted to the display driver IC, and further configured to determine whether there is a touch based on the one or more sensing signals from the display driver IC.

7. The display device of claim 1, wherein the display driver IC further comprises a switching unit configured to connect the common voltage to the plurality of driving electrodes and the plurality of sensing electrodes during the display driving mode, and the switching unit is configured to connect the driving pulse to the plurality of driving electrodes during the touch driving mode.

8. The display device of claim 1, wherein the display driver IC further comprises a register configured to store a value of the second level and a value of the fourth level of the driving pulse for each of the plurality of driving electrodes.

9. The display device of claim 8, wherein the register stores, for each of the plurality of driving electrodes, a first duration of time in which to output the second level of the driving pulse and a second duration of time in which to output the fourth level of the driving pulse.

10. The display device of claim 9, wherein the touch IC comprises an operation unit configured to perform an arithmetic operation on the value of the second level and the value of the fourth level according to each of the one or more sensing signals to output a corresponding control signal, and the display driver IC generates the driving pulse including the second level and fourth level which are based on the corresponding control signal.

11. The display device of claim 10, wherein the corresponding control signal comprises a control signal based on an arithmetic operation which is performed on the first duration of time in which to output the second level of the driving pulse and the second duration of time in which to output the fourth level of the driving pulse according to the one or more sensing signals.

12. A method of driving a display device with an integrated touch screen that includes a panel configured to operate in a display driving mode and a touch driving mode, the panel including a plurality of driving electrodes and a plurality of sensing electrodes, the method comprising:

applying a common voltage to the plurality of driving electrodes and the plurality of sensing electrodes during the display driving mode of the panel;

adjusting a magnitude of a driving pulse applied to the plurality of driving electrodes during the touch driving mode of the panel, the magnitude of the driving pulse adjusted from a first level to a second level and subsequently from the second level to a third level during the touch driving mode of the panel, wherein the third level is less than the second level and greater than the first level;

receiving one or more sensing signals from the plurality of sensing electrodes responsive to a touch of the integrated touch screen during the touch driving mode; and adjusting the magnitude of the driving pulse from the third level to a fourth level and subsequently from the fourth level to the first level during the touch driving mode of the panel, wherein the fourth level is less than the first level, wherein a difference in magnitude between the second level and the third level of the driving pulse is different than a difference in magnitude between the fourth level and the first level of the driving pulse.

13. The method of claim 12, wherein the driving pulse is applied according to a voltage level of a timing pulse that alternates between a first voltage level and a second voltage level that is greater than the first voltage level.

14. The method of claim 13, wherein the second level of the driving pulse is applied for a first period of time when the timing pulse is at the second voltage level and the third level of the driving pulse is applied for a second period of time following the first period of time when the timing pulse is at the second voltage level.

15. The method of claim 13, wherein the fourth level of the driving pulse is applied for a first period of time when the timing pulse is at the first voltage level and the first level of the driving pulse is applied for a second period of time following the first period of time when the timing pulse is at the first voltage level.

* * * * *